May 19, 1925.
G. BATY
MOTOR VEHICLE HOOD HINGE
Filed July 29, 1920
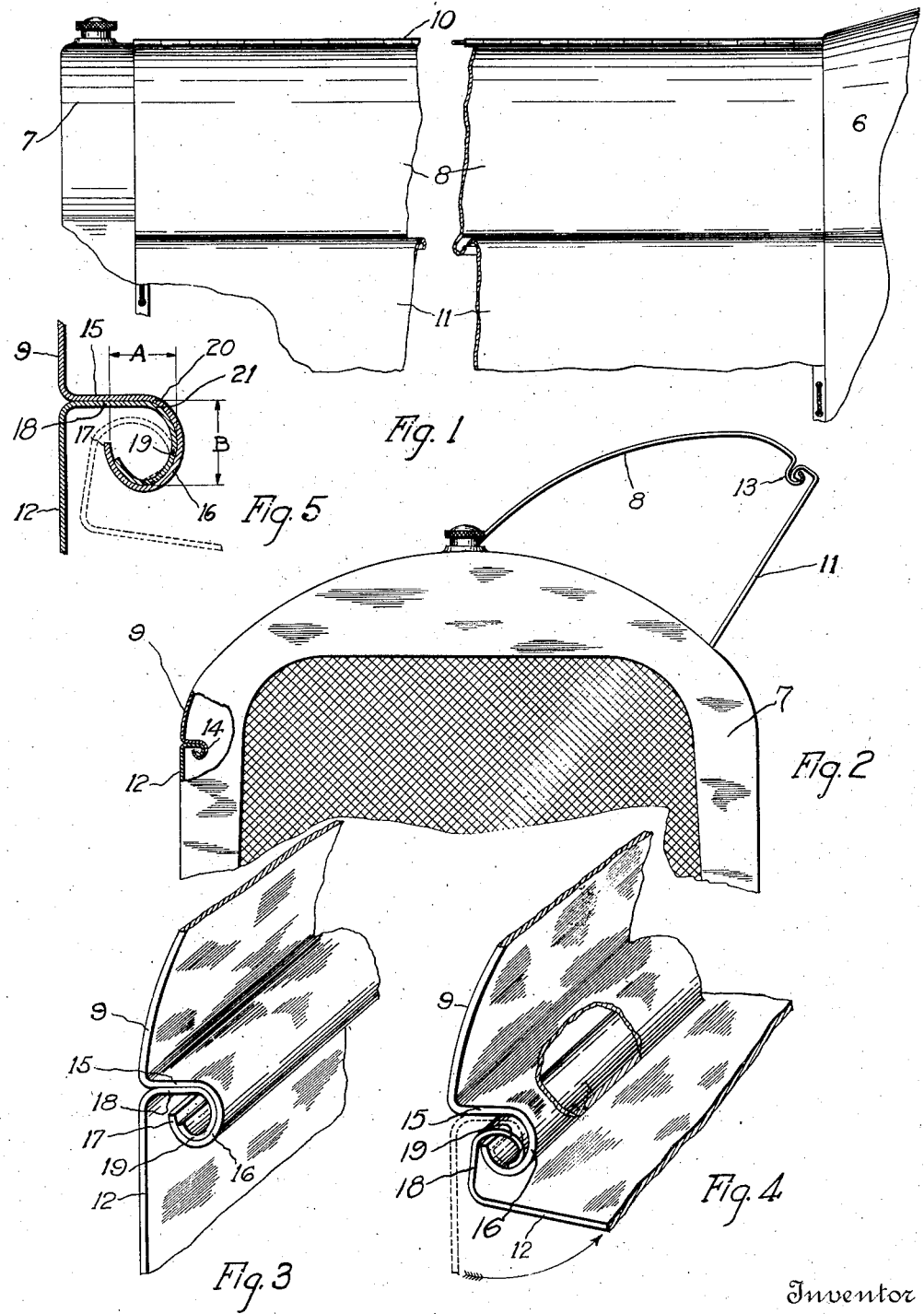
Inventor
George Baty
By Blackmore, Spencer & Flint
Attorneys
1,538,877

Patented May 19, 1925.

1,538,877

UNITED STATES PATENT OFFICE.

GEORGE BATY, OF BROOKLYN, NEW YORK, ASSIGNOR TO GENERAL MOTORS CORPORATION, OF DETROIT, MICHIGAN, A CORPORATION OF DELAWARE.

MOTOR-VEHICLE-HOOD HINGE.

Application filed July 29, 1920. Serial No. 399,844.

*To all whom it may concern:*

Be it known that I, GEORGE BATY, a subject of the King of Great Britain, and a resident of Brooklyn, county of Kings, and State of New York, have invented certain new and useful Improvements in Motor-Vehicle-Hood Hinges, of which the following is a full, clear, concise, and exact description, as will enable others skilled in the art to which the invention relates to make and use the same, reference being made therein to the accompanying drawing, which forms a part of this specification.

My invention relates to automobiles, motor driven trucks, and similar self-propelled vehicles, and particularly to the hood construction thereof which forms a closure for the engine whereby the vehicle is driven, and which commonly extends between the front end of the vehicle body and the radiator which is located forward of and spaced some distance apart from said front end.

More particularly stated, my invention relates to hoods of the general type referred to and in which the doors thereof are made up each of two sections pivotally connected one with the other through a hinge connection intermediate the height of the hood; two such door structures being commonly employed, one upon each side of the hood, and the upper ends thereof being suitably supported from the top of the hood adjacent the central portion thereof commonly also by means of a hinge or equivalent pivotal connection.

The principal object of my invention is to provide an improved hood structure of the kind last above mentioned and wherein the separate door sections of each of the two pairs or sets of hood doors are pivotally connected with one another through an improved form of hinge joint or connection between the meeting edges of said door sections, the form of the pivotal connection between the door sections being such that the hinge connection is loose when the door sections are in their open condition to permit access to the engine within the hood, and tight when the door sections are in their closed condition.

A further object of my invention is to provide a hood construction for motor driven vehicles in which the two door sections upon each side of the hood are connected together through a hinge connection which is loose when the door sections are open, and tight when the door sections are closed; and in which the form of pivotal or hinge connection between the sections is such that said sections may be readily separated from one another when they are in their open condition, while when said sections are in their closed conditions the looseness between the parts will be taken up so that there will be no movement between the parts and no rattling at the hinge connections when the door sections are closed.

A further object of my invention is to provide an improved hood construction for motor driven vehicles wherein the door sections upon each side thereof are made from sheet metal and are pivotally connected one with the other through a hinge connection formed by bending and imparting the proper form to the meeting edges of said sections the form of the bent and interengaging portions of the door sections being such that the hinge connection which they provide will be loose when the doors are open, and tight when the doors are closed; thus providing a hood door structure which may be readily manufactured, and the cost of which will be reduced to a minimum, as the interengaging portions of the two door sections are integral with the sections and are formed in the sections themselves by bending portions at the edges of the sections in such a manner as to provide a hinge connection when said bent portions are in engagement one with the other.

The drawing accompanying and forming a part of this specification illustrates the preferred form of my invention, altho it will be appreciated that various changes may be made as regards the details of construction of the hinge connection between the door sections which the drawing illustrates. I therefore regard my invention as including all such variations and modifications of the particular embodiment thereof illustrated as come within the scope of the concluding claims, wherein the distinguishing features in which my invention consists are particularly pointed out.

Referring now to the drawings:

Figure 1 is a fragmentary view showing a hood for a motor driven vehicle in side elevation, the doors being closed.

Figure 2 is a view showing a motor vehicle hood in front elevation, the door sections upon the left-hand side of the view being shown closed, while those upon the right-hand side are in their open condition.

Figure 3 is a fragmentary perspective view illustrating the condition of the interengaging hinge portions of the two door sections when the said sections are in their closed condition.

Figure 4 is a fragmentary perspective view illustrating the position assumed by the interengaging hinge portions of the door sections when the door sections are in their open condition.

Figure 5 is a fragmentary end view of the hinge connection between the door sections and in which the mode of operation of the parts is illustrated by the use of full and dotted lines.

In the drawing, the reference numeral 6 designates the front end of a motor driven vehicle body, and 7 the radiator of the vehicle which, as will be appreciated, is spaced apart from the front end of the vehicle body so as to provide a space between the said parts within which the engine which drives the vehicle is located.

The space between the front end 6 of the body and the radiator 7 is closed by means of suitable hood doors which may be opened to permit access to the engine located within the hood, said doors in the form of hood to which my invention relates being made up of two upper door sections 8, 9 which are pivotally supported adjacent the upper end of the hood, as by means of a hinge connection 10 extending along the hood but the form of which hinge connection is in no way involved in the invention to which this application relates. Located below the door sections 8, 9 are two other door sections 11, 12 the upper ends of which are pivotally connected with the lower ends of the upper door sections 8, 9 through hinge connections 13, 14, as best shown in Figure 2, while the lower ends of said lower door sections are commonly provided with suitable fastening devices not shown whereby the doors may be detachably secured to fixed supports, to thereby hold the hood doors closed.

The invention to which this present application relates is concerned with the form, character and operation of the hinge connection or joint provided between the lower edges of the upper door sections 8, 9 and the upper edges of the door sections 11, 12, the form of the said hinge joints or connections being illustrated in detail in Figures 3 to 5 of the drawing as well also as the mode of operation inherent in the construction shown.

Referring now particularly to Figures 3 to 5 of the drawing, the lower edge of each upper door section which is made commonly from sheet metal is bent inwardly, as shown at 15, and then downwardly and is so shaped as to provide a rolled portion 16, the free edge of which rolled portion lies beneath the horizontal shelf portion 15 and is spaced apart therefrom as shown; the form of the rolled portion 16 being elliptical or oval, as distinguished from cylindrical, so that the height thereof indicated by the reference letter —B— in Figure 5 is greater than its width —A— thereof also indicated in said figure. This rolled portion preferably extends throughout the entire length of the upper door section 9; and the same may be formed by the use of any suitable type of rolling or shaping machine or device suitable for imparting the form shown and above described to the hinge portion in question at the lower edge of the said door section.

The upper edge of the lower door section 12 is also bent to provide a substantially horizontal shelf portion 18 which lies beneath the shelf 15 of the upper door section, and a rolled portion 19 similar in form to, but smaller than the rolled portion 16 of the upper door section, and lying within the same when the parts are assembled as clearly shown in the drawing. This rolled portion of the lower door section is likewise oval or elliptical in form, the same as the rolled portion of the upper section, and its vertical or height dimension is greater than its horizontal dimension or width. The rolled portion of the lower door section may also be formed in any suitable way and by the use of any suitable machine, tool or device, and the same preferably extends throughout the length of the lower door section so that when the two rolled hinge portions are assembled they will be in engagement with one another throughout the entire length of the said door sections, and throughout the entire length of the hood.

Figure 3 shows the position assumed by the interengaging rolled hinge portions 16, 19 of the upper and lower door sections when the said sections are in their closed condition; the form of the contacting surfaces of the hinge portions being such that when the door sections are closed there will be contact between the meeting surfaces of the hinge portions of the two door sections throughout substantially their entire area, so that when the door sections are closed there will be no looseness at the hinge connection between the said members. As a matter of fact the parts are preferably so shaped that there will be a slight binding action between the interengaging hinge portion when the door sections are in their closed condition, this insuring a more certain contact throughout the entire meeting surfaces of the hinge portion of the two door sections and more certainly preventing movement of one relative to the other.

As the door sections are opened, however, the upper portions 20, 21, see Figure 5, of the rolled hinge forming portions thereof move apart from one another, which movement will cause the rolled portion 19 of the lower door section to assume a position lying within the outer rolled section 16 of the upper door section with its longer dimension —B— disposed at an angle to the like longer dimension of the rolled portion of the upper door section, as shown in dotted lines in Figure 5 and in full lines in Figure 4; the longer dimensions of the two rolled portions thus assuming positions inclined relative to one another as distinguished from coincident with one another as is the case when the door sections are closed. This action characterized, as will be appreciated, by movement of the longer dimensions of the two rolled portions of the door sections out of coincidence with one another will result in a looseness in the hinge connection, as shown in Figures 4 and 5, from which it follows that when the door sections are open the hinge connections between them will be loose throughout its entire length.

It therefore follows that in the improved joint or hinge connection in which my invention consists there is a binding action between the interengaging portions of the two door sections when the said sections are in their closed condition which prevents rattling and provides a tight closure between the parts, whereas when the door sections are open the joint between them is loose, so that the lower section may, if desired, be moved laterally and separated from the upper section; there being no frictional engagement between the parts when the door sections are open because of the absence of contact between the co-operating surfaces of the rolled portions at such times, due to the form of the interengaging portions of the said sections. Incidentally, the form of hinge connection in which my invention consists provides a construction in which a binding of the parts, with resulting tightness, is secured when the doors are closed, and a construction in which the doors may be easily opened; as the initial movement of the lower door section upward results in a separation of the contacting surfaces of the hinge portions of the door sections, with the result that there is no friction at the hinge joint between the parts during the opening movement of the door.

Having thus described and explained my invention, I claim and desire to secure by Letters Patent:

1. In a hood for motor driven vehicles, two door sections formed from sheet metal and the adjacent edges of which are bent inward to provide substantially horizontal shelf portions which contact with one another when the hood is closed, and then downward and outward to provide interengaging rolled portions extending along and continuous from one end of each section to the other, and which rolled portions provide a pivotal or hinge joint connection between said sections; said rolled portions lying one within the other and the same being greater in height than in width so that the hinge connection aforesaid will be tight when the sections are in their closed condition, and loose when the sections are in their open condition.

2. In a hood for motor driven vehicles, two door sections the adjacent edges of which are bent inward to provide substantially horizontal shelf portions adapted to engage one another when the sections are closed, and then downward and outward to provide interengaging rolled portions lying one within the other and which rolled portions provide a pivotal or hinge joint connection between said sections; said rolled portions being greater in height than in width so that the hinge connection aforesaid will be tight when the sections are in their closed condition, and loose when the sections are in their open condition.

3. In a hood for motor driven vehicles, two door sections the adjacent edges of which are bent inward to provide substantially horizontal shelf portions in contact with one another when the hood is closed, and then downwardly and outward to provide interengaging rolled portions lying one within the other and which rolled portions provide a pivotal or hinge joint connection between said sections, the arrangement of said parts being such that said shelf portions are out of contact with one another when said door sections are folded to open the hood.

4. In a hood for motor driven vehicles, two door sections having each a roll portion extending along one side thereof and off-set inwardly from the outer surface of said sections, so that said roll portions lie within the hood when the doors are closed; said roll portions lying one within the other to thereby provide a pivotal or hinge joint connection between said sections and said portions being greater in height than in width, so that the hinge connection aforesaid will be tight when the sections are in their closed condition, and loose when the sections are in their open condition.

5. In a hood for motor driven vehicles, two door sections formed from sheet metal and having each a roll portion integral therewith and extending along one side thereof, and which roll portions lie one within the other to thereby provide a pivotal or hinge joint connection between said sections; said roll portions being greater in height than in width so that the hinge connection aforesaid will be tight when the sections are in their closed condition, and loose when the sections are in their open condition.

In testimony whereof I affix my signature.

GEORGE BATY.